United States Patent
Hunt et al.

(10) Patent No.: US 10,489,218 B2
(45) Date of Patent: Nov. 26, 2019

(54) SUPPRESSION OF SPECULATIVE ACCESSES TO SHARED MEMORY LOCATIONS AT A PROCESSOR

(71) Applicant: ADVANCED MICRO DEVICES, INC., Santa Clara, CA (US)

(72) Inventors: Douglas Benson Hunt, Fort Collins, CO (US); William E. Jones, Fort Collins, CO (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 71 days.

(21) Appl. No.: 15/847,006

(22) Filed: Dec. 19, 2017

(65) Prior Publication Data

US 2019/0188055 A1    Jun. 20, 2019

(51) Int. Cl.
*G06F 13/16* (2006.01)
*G06F 12/14* (2006.01)
*G06F 9/52* (2006.01)

(52) U.S. Cl.
CPC .......... *G06F 9/528* (2013.01); *G06F 12/1425* (2013.01); *G06F 13/1663* (2013.01)

(58) Field of Classification Search
CPC .. G06F 12/0215; G06F 12/1425; G06F 9/528; G06F 13/1663
See application file for complete search history.

(56) References Cited

U.S. PATENT DOCUMENTS

2015/0347133 A1* 12/2015 Gschwind ............... G06F 9/528
                                                      712/239

* cited by examiner

*Primary Examiner* — Aracelis Ruiz

(57) ABSTRACT

A method of monitoring, by one or more cores of a multi-core processor, speculative instructions, where the speculative instructions store data to a shared memory location, and where a semaphore, associated with the memory location, specifies the availability of the memory location to store data. One or more speculative instructions are flushed based on when the semaphore specifies the memory location is unavailable. Any further speculative instructions are suppressed from being issued based on a count of flushed speculation instructions above a specified threshold, executing the speculative instructions when the semaphore specifies the memory location is available, and storing the data to the memory location.

20 Claims, 3 Drawing Sheets

US 10,489,218 B2

SUPPRESSION OF SPECULATIVE ACCESSES TO SHARED MEMORY LOCATIONS AT A PROCESSOR

BACKGROUND

Description of the Related Art

A multi-core processor includes several processor cores (cores) in one physical package, where the cores share common resources, including portions of memory. Each core is configured to operate relatively independently of each other to execute sets of instructions, referred to as program threads (threads). To improve processing efficiency, each core can execute selected instructions speculatively, based on anticipated future data needs, predicted program branch decisions, and the like.

One example of speculative operations is speculative access to a shared memory location by a core. In particular, memory contention issues arise when two or more cores attempt to access the same memory location at the same time. To prevent memory contention, the processor implements a "semaphore" memory control scheme, whereby the value of a stored semaphore indicates whether a corresponding memory location is "owned" by a program thread—that is, whether the memory location is in the process of being accessed by a different program thread running on one of the other cores. Thus, to access a shared memory location, a program thread first tests the semaphore value by issuing operations to load the semaphore value, and compares the loaded value to a specified value that indicates whether the shared memory location is presently owned by another thread. If the shared memory location is not owned by another thread, the program thread issues operations to set the value of the semaphore to take ownership of the shared memory location, and then accesses the shared memory location. To improve processing efficiency, one or more of the operations to test and set the semaphore can be issued speculatively.

BRIEF DESCRIPTION OF THE DRAWINGS

The present disclosure is better understood, and its numerous features and advantages made apparent to those skilled in the art by referencing the accompanying drawings. The use of the same reference symbols in different drawings indicates similar or identical items.

DETAILED DESCRIPTION

Figure 1:
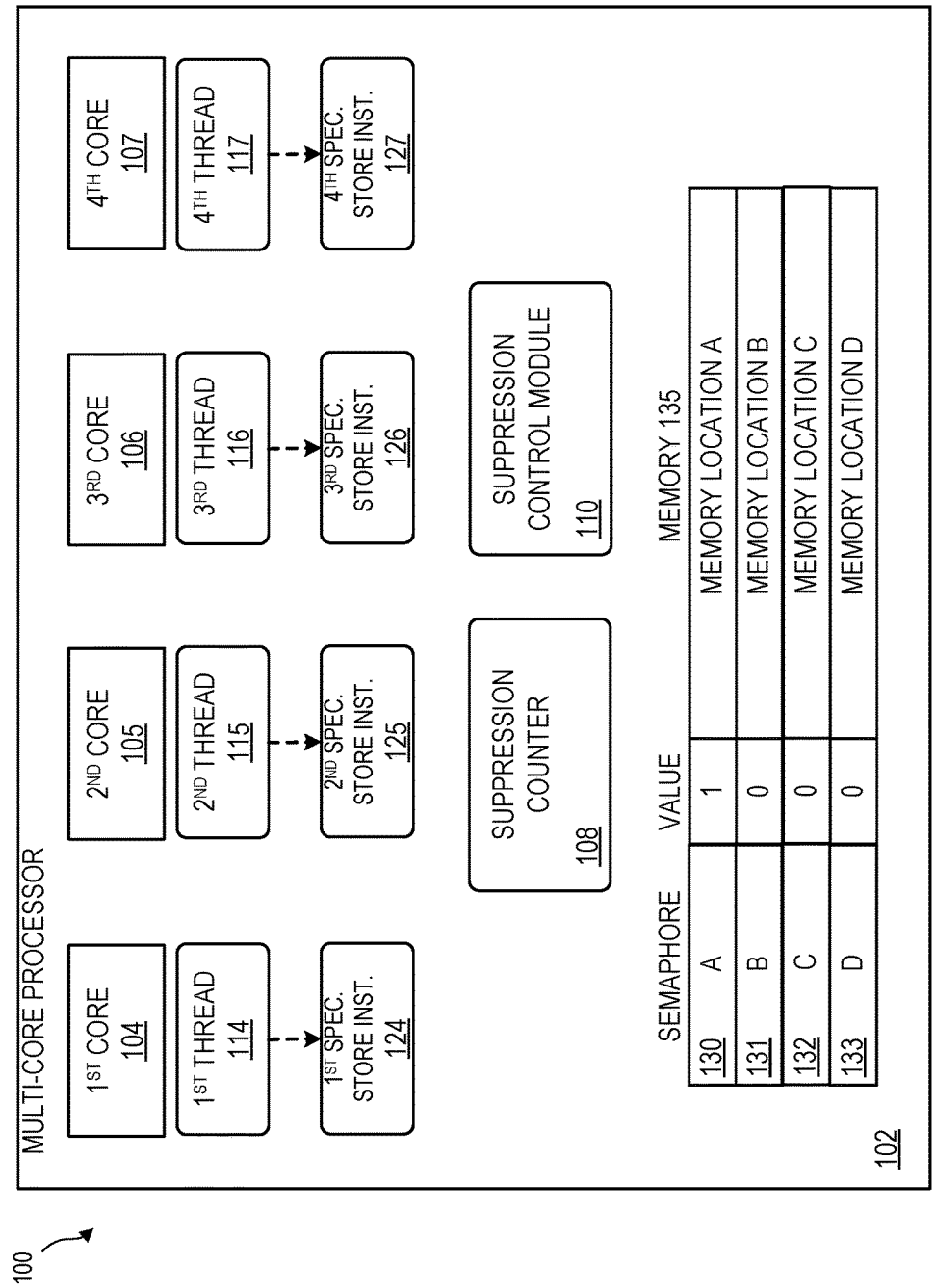
FIG. 1 illustrates a block diagram of a processing system that suppresses speculative store instructions to a semaphore associated with a shared memory location in accordance with some embodiments.
Figure 2:
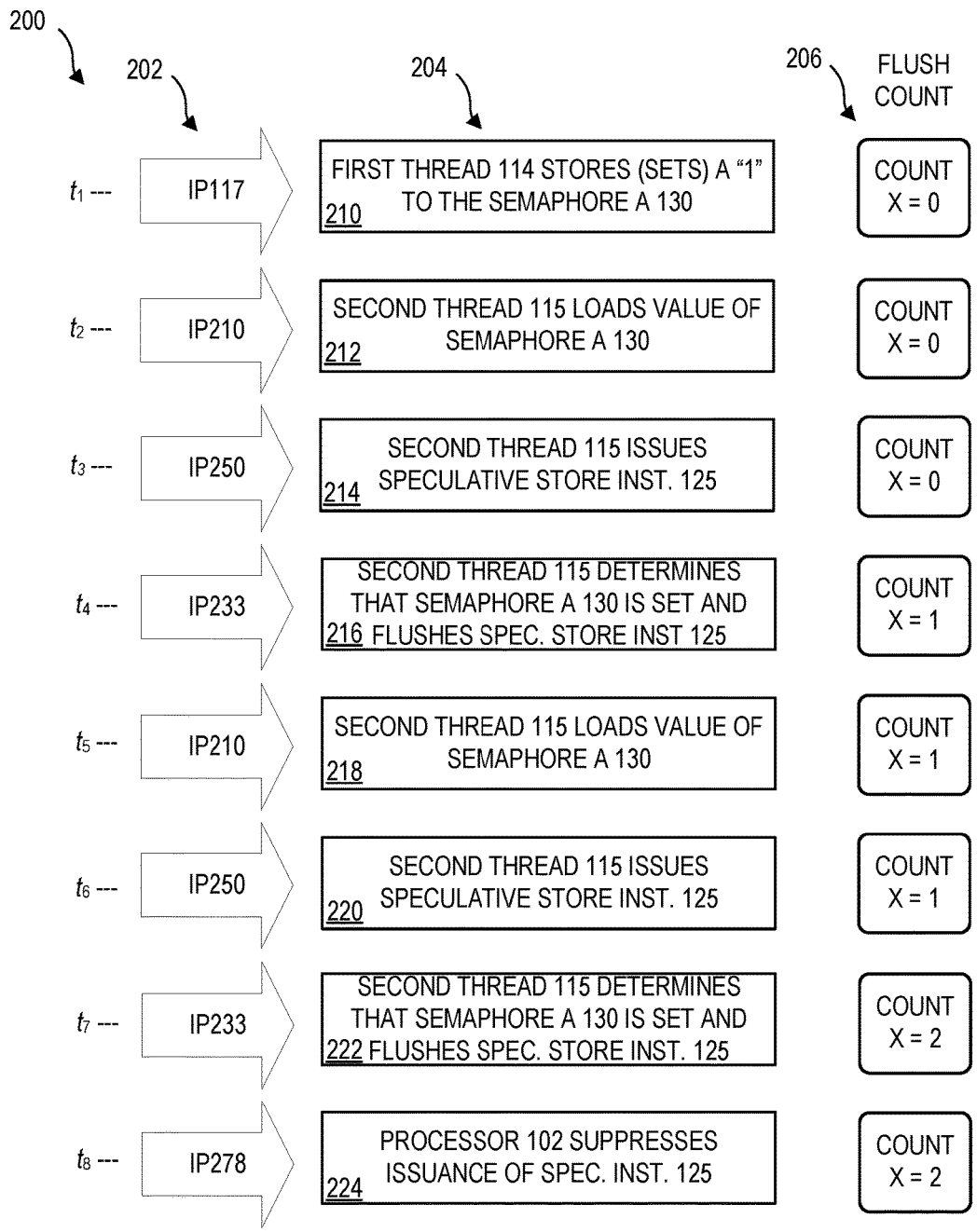
FIG. 2 illustrates an example of the processing system of FIG. 1 suppressing a speculative store instruction to a semaphore in accordance with some embodiments.
Figure 3:
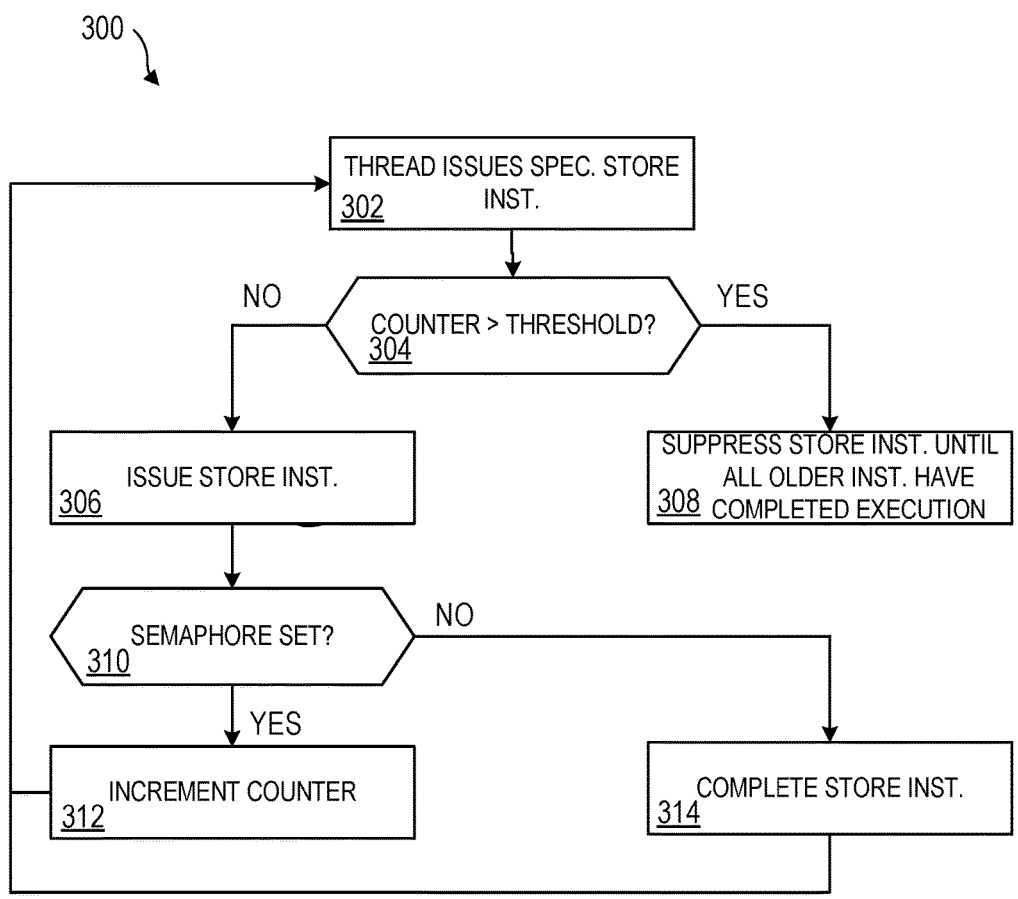
FIG. 3 illustrates a flow diagram illustrating a method for suppressing speculative store instructions that accesses semaphores in accordance with some embodiments.

FIGS. 1-3 illustrate techniques for suppressing speculative operations for accessing a semaphore that controls access to a shared memory location. A processor monitors instruction pointer (IP) values corresponding to speculative accesses (e.g., instructions or operations) to the semaphore, and further monitors the number of times that the speculative accesses are flushed (referred to herein as a "flush count") from an instruction pipeline because the semaphore is set (i.e., because the shared memory location is presently owned by another program thread). If the flush count for the speculative accesses exceeds a threshold value, the processor suppresses subsequent speculative accesses to the semaphore, thereby conserving processor resources and improving processor efficiency.

To illustrate via an example, in order to take ownership of a shared memory location, a program thread issues a set of operations referred to for purposes of description herein as "test-and-set" operations. The test-and-set operations together test the value of the semaphore corresponding to the shared memory location. If the semaphore is clear (e.g., a value of "0"), the test-and-set operations set the value of the semaphore to "1", thereby giving ownership of the shared memory location to the program thread, until that same program thread subsequently clears the semaphore. If the test- and set operations indicate the semaphore is set, the shared memory location is presently owned by another program thread. Accordingly, the program thread that wants access to the semaphore must wait for a specified amount of time, and then reissues the test- and set operation until the program thread is able to set the value of the semaphore, and thus take ownership of the shared memory location.

To perform the test-and-set operations, the program thread issues at least two instructions when accessing the semaphore: a load operation to load the value of the semaphore to a register, where the value can be tested, and a store operation to store a value to the semaphore. If the load operation returns a value of "0", the semaphore is clear and can be controlled by the program thread. This is accomplished by the program thread issuing a store operation to store a value of "1" to the semaphore, thus setting and owning the semaphore. Once the semaphore is owned by the program thread, then the program thread has exclusive control of the memory location associated with that semaphore, and the program thread can manipulate the data stored in that memory location as desired. Once the program thread has finished manipulating the data at that memory location, it then issues a store operation to the semaphore to change the value to "0", thus clearing the semaphore and allowing other program threads to access the semaphore. An example of test-and-operations are illustrated by the following pseudo-code:

```
Semaphore_loop:
    Load semaphore
    If (semaphore == 1) {   /* another process is holding the semaphore
        Jump to semaphore_loop
                }
    Else {
        Store semaphore := 1
            }
    Use shared memory ...
    Store semaphore :=1 /* done with shared memory
```

In order to increase processor efficiency and response times, at times the "test-and-set" operations are performed speculatively. For example, during system operations, the test and set operation is issued speculatively before some older instructions have completed executing, but the processing system proceeds with executing test-and-set operations early. The test-and-set operations are executed by the system by performing multiple operations. In some embodiments, these operations include a load instruction to retrieve the semaphore from memory, a compare instruction of the semaphore's value retrieved (e.g., compared to "0"), and an optional store of a value (e.g., a "1") to the semaphore if the result of the compare is true. When the system speculatively executes the test-and-set operations, it is not certain that the system will succeed in gaining access to the semaphore. In cases where the system succeeds in acquiring the semaphore, the system receives a writable copy of the memory location early, thus improving system performance.

If the system doesn't acquire the semaphore (e.g., the semaphore is owned by another thread), then receiving the writable copy early uses limited system resources and hinders system performance. In particular, when several processes running on different cores of the system are all trying to acquire the same semaphore, it is desirable to give each core a shared, read-only copy of the cache line (memory location) containing the semaphore. When the processing system is finished with the current set of instructions, a store instruction that releases the semaphore invalidates the shared copy of the cache line from the other cores so that the core in question can acquire an exclusive, writeable copy of the cache line. This action enables the core to store a value to the cache line. The other cores then try to read the cache line again. Eventually, one of the cores succeeds and acquires the cache line and thus acquires the semaphore. However, in cases where a core has taken ownership of the semaphore speculatively, and then has to surrender the semaphore before it accesses the memory location (because it is still executing older instructions when another core takes ownership of the semaphore), the resources consumed in executing the speculative instructions are effectively wasted. Accordingly, to improve processing efficiency, a processor core monitors when speculative store operations for a given semaphore have been flushed a threshold number of times, and in response the processor core suppresses subsequent speculative store operations. Instead, the processor core awaits the completion of the compare operation before issuing the store.

FIG. 1 illustrates a block diagram of a processing system 100 that suppresses speculative store instructions to a semaphore associated with a shared memory location in accordance with some embodiments. The processing system 100 is one of a general-purpose processor, an application specific integrated circuit (ASIC), a field-programmable gate array (FPGA), and the like, and is incorporated into any of a variety of electronic devices, including a desktop computer, laptop computer, server, tablet, smartphone, gaming console, virtual reality system, and the like. As described further herein, the processing system 100 is generally configured to execute sets of instructions, organized as computer programs or applications in order to carry out tasks defined by the application on behalf of the electronic device.

The processing system 100 includes a multi-core processor 102 having four processor cores, referred to as cores 104-107. Each core 104-107 executes instructions, accesses shared memory locations, and performs functions independently from the other cores 104-107. To execute instructions, each of the cores 104-107 includes an instruction pipeline and associated hardware to fetch computer program instructions, decode the fetched instructions into one or more operations, execute the operations, and retire the executed instruction. Each of the cores 104-107 can therefore be a general-purpose processor core, such as a central processing unit (CPU), or can be a core designed to execute special-purpose instructions, such as a graphics processing unit (GPU) core, digital signal processor (DSP) core, and the like. The cores 104-107 share common resources, including portions of memory, and each core 104-107 runs a program thread 114-117, respectfully, independently of the other cores 104-107. Thus configured, the processor 102 is a multi-threaded processor where each core 104-107 can independently execute program threads 114-117.

The processor 102 also includes a shared memory 135, which is a hardware device having a plurality of individual memory locations A-D used by the processor 102 for immediate storage and retrieval of data. Access to the plurality of individual memory locations A-D are controlled by the semaphores A-D 130-133, respectfully. In the example shown in FIG. 1, semaphore A 130 controls access to memory location A, and contains a value of "1", indicating that the semaphore A 130 is set, thus also indicating that the individual memory location A is owned by another program thread 114-117, and therefore inaccessible for store or load operations. It will be appreciated that although the individual memory locations A-D, as represented by the shared memory 135, are illustrated as single locations, in some embodiments, the shared memory 135 often represents multiple locations existing in a memory hierarchy operating as understood by one skilled in the art.

In response to receiving the store or load instruction from the program threads 114-117, the shared memory 135 identifies which memory location is targeted by the request and, depending on the type of memory access, writes data into the memory location (store) or reads the data present at that memory location (load). It will be appreciated that, while the shared memory 135 is illustrated in FIG. 1 as being part of the processor 102, in some embodiments all or part of the shared memory 135 is separate from, or external to, the processor 102. For example, in some embodiments, all or part of the shared memory 135 is incorporated in a separate integrated circuit die from the processor 102, with the dies of the processor 102 packaged together in a common integrated circuit package. In the course of executing instructions, the threads 114-117 generate instructions to access data stored in the shared memory 135 of the processor 102. These instructions are referred to herein as "memory accesses". Each memory access instruction includes an address in memory indicating a memory location that stores the data to be accessed. In response to generating a memory access, the threads 114-117 attempt to satisfy the memory access using the memory 135. Once the data has been retrieved to or from the memory 135, the memory access is satisfied.

In the present embodiment, the processor 102 has four independent threads 114-117 running simultaneously, with each thread 114-117 executing instructions. This results in the processor 102 executing many instructions simultaneously. In the course of running several threads 114-117 simultaneously, one or more cores 104-107 generate access requests to store or load data to and from the memory 135. As the memory 135 can only process one instruction at a time, memory contention occurs when the memory 135 receives more than one access request at the same time. To avoid this issue, the processor 102 uses semaphores 130-133 to control access to the memory 135. In the following example, it is assumed that a first thread 114 is trying to access memory location A by using semaphore A 130. In order for a thread 114 to access the location in memory 135, the thread 114 must first establish control over the semaphore 130 associated with the location in memory 135. The process begins when the thread 114 that wants access to the location in memory 135 follows the "test-and-set" operation to take control of the semaphore 130 associated with that location in memory 135. First, the thread 114 issues an instruction to load the value of the semaphore 130. The thread 114 then reads the value; if the semaphore 130 is "set", the thread 114 knows that the semaphore 130 is already controlled by another thread 115-117, and the process ends. If, however, the test shows that the semaphore 130 is clear, the thread 114 then issues a store instruction to set the value of the semaphore 130, thus alerting other threads 115-117 that the semaphore 130 is set, and that the location A in memory 135 is unavailable. Once the semaphore 130 is set, the thread 114 can then store and load data to the location in memory 135 that is associated with the set semaphore 130.

In the continuing effort to increase processor efficiency and speed, threads 114-117 sometimes execute the "test-and-set" operations speculatively by attempting to access a semaphore 130-133 directly, and without first ascertaining the state of the semaphore 130-133. The operation to access a semaphore 130-133 without first determining the state of the semaphore 130-133 is called a speculative instruction or operation, as it is unknown at the time the instruction is issued whether the instruction will be executed or flushed. The threads 114-117 accomplish this by issuing speculative instructions 124-127, respectfully, to store a value of "1" into the semaphores 130-133 and thus own them. If successful, processing time and power usage is reduced, and the processor 102 efficiency is increased. If, however, the semaphore 130-133 is already set, the speculative instruction 124-127 is flushed. In some embodiments, the threads 114-117 also keep a count "X" of the number of times a speculative instruction 124-127 is flushed by using a suppression counter 108. The suppression counter 108 maintains a count "X" of the number of times a speculation instruction 124-127 is flushed by the one or more threads 114-117.

The processor 102 also includes a suppression control module 110 that runs a "suppression count algorithm" for determining whether further speculative instructions 124-127 should be issued by the threads 114-117, where the algorithm is based on the value of the count X stored in the suppression counter 108. It will be appreciated that, while suppression counter 108 is illustrated at FIG. 1 as a single counter, in some embodiments each core 104-107 maintains separate counters to identify the number of times a store instruction has been flushed, with each counter associated with a specific semaphore 130-133. In the depicted example, the suppression control module 110 compares the count X with a specified threshold value stored at a register (not shown). Once the count X exceeds the specified threshold value for a given semaphore 130-133, further speculative store instructions 124-127 to that semaphore 130-133 are suppressed or suspended by the suppression control module 110. In some embodiments, the suppression control module 110 stops suppressing the issuance of speculative store instructions based on one or more specified criteria, such as expiration of a threshold amount of time, after ownership of the corresponding semaphore has been claimed by a processor core, and the like.

FIG. 2 illustrates an example 200 of the processing system 100 of FIG. 1 suppressing a speculative store instruction to the semaphore A 130 in accordance with some embodiments. Example 200 includes a list of IP addresses 202, a corresponding list of instructions 204, and a running count X 206 of suppressed (flushed) speculative instructions 125. In the example of FIG. 2, the second core 105 attempts to speculatively store data to the semaphore A 130 but, because the semaphore A 130 is already owned (set) by the first core 104, the speculative store instructions 125 are flushed. Furthermore, once the same speculative instruction 125 (as indicated by the IP value of the instruction) has been flushed a threshold number of times as recorded by the suppression counter 108 monitoring the count X 206, the processor 102 suppresses subsequent instances of the speculative instruction 125. In the example 200, the IP addresses 202, instructions 204, and the flush count 206 are merely representative and can change.

In the example of FIG. 2, the speculative store instruction 124 is flushed when the core 104 determines that the instruction 124 should not be executed (e.g., because the test portion of the test-and-set failed). When this occurs, the core 104 resumes the execution of instructions from the point where the interruption occurred. Once the processing system 100 resumes issuing speculative store instructions 124, the core 104 fetches the store instruction 124, but the core 104 waits to actually request the cache line from memory until the test operation indicates that the store instruction 124 will actually complete.

The example 200 begins at time $t_1$ at IP117 and block 210 where the first thread 114 issues a store instruction 124 to set the value "1" to the semaphore A 130. After this instruction is executed, the semaphore A 130 is set and is owned by the first thread 114, and the count X 206 remains at "0". The count X 206 has not incremented as the store instruction 124 is not a speculative instruction, nor has it been flushed.

Next, at time $t_2$ at IP210 and block 212, the second thread 115 issues a load instruction to load the value of the semaphore A 130 into memory. After this action, the count X remains at "0". Again, the count X remains at "0" as IP210 is a load instruction and not a store instruction, nor has it been flushed.

Next, at time $t_3$ at IP250 and block 214, the second thread 115 issues a store instruction 125 before the load instruction at block 212 has completed execution. As the second thread 115 has not determined the value of the semaphore A 130 before issuing the store instruction 125, the store instruction 125 is a speculative instruction. The count X 206 remains at "0" as no instruction has been flushed.

Next, at time $t_4$ at IP233 and block 216, the second thread 115 determines that the semaphore A's 130 value is "1" indicating that the shared memory location 140 has been set by another thread, and flushes the speculative store instruction 125 that was issued at time $t_3$. The value of "1" in the semaphore A 130 tells the other threads 115-117 that the memory location A 140 is set and cannot be accessed. The count X 206 is thus incremented to "1".

Next, at time $t_5$ at IP210 and block 218, the second thread 115 issues another load instruction to load the value of the semaphore A 130 into memory. After this action, the count X remains at "1".

At time $t_6$ at IP250 and block 220, the second thread 115 issues another store instruction 125 before the load instruction at block 218 has completed execution. As before, as the second thread 115 has not determined the value of the semaphore A 130 before issuing the store instruction 125, the store instruction 125 is a speculative instruction. The count X 206 remains at "1".

Next, at time $t_7$ at IP233 and block 222, the second thread 115 again determines that the semaphore A's 130 value is "1" indicating that the shared memory location 140 has been set by another thread, and again flushes the speculative store instruction 125 that was issued at time $t_6$. The count X 206 is thus incremented to "2".

Finally, at time $t_8$ at IP278 and block 224, the count X 206 of 2 has reached the specified threshold value of 2, and thereafter the processor 102, via the suppression control module 110, suspends any further speculative instructions 125 from being issued until the suppression counter 108 has been decremented below 2. Thus, instead of issuing the store instruction 125 speculatively, the processor 102 waits for the load operation and the compare operation to complete before issuing the store instruction 125.

FIG. 3 illustrates a flow diagram of a method 300 for suppressing speculative store instructions that access semaphores in accordance with some embodiments. The method 300 is described with respect to an example implementation at the processor system 100 of FIG. 1. The method 300 begins at block 302 where the first core 104 running the first thread 114 issues a speculative store instruction 124 directed to the semaphore A 130. At block 304, the thread 114 determines whether the count X 206 of the number of flushed speculative instructions 124 in the suppression counter 108 exceeds the specified threshold value as set by the processor 102. If the count X 206 exceeds the threshold, the method 300 continues to block 308, where the suppression control module 110 prevents the thread 114 from issuing any speculative store instructions 124 until all of the older instructions have completed their execution, thus suppressing further speculative store instructions 124. If, at decision block 304, the thread 114 determines that the count X of flushed speculative store instructions 124 is not greater than the threshold, the thread 114 is allowed to issue the speculative store instruction 124 at block 306. Next, the method 300 continues at decision block 310, with the thread 114 determining whether the semaphore A 130 has been set to a value of "1". If the semaphore A 130 has not been set, the method 300 continues to block 314, where the thread 114 completes the store instruction 124, sets the value of the semaphore A 130 to "1", and the method 300 flow returns to block 302. On the other hand, if at block 310, the method 300 determines that the semaphore A 130 has already been set to "1", then the method 300 continues to block 312 where the speculative store instruction is flushed and the suppression counter 108 increments the count X. Afterwards, the method 300 returns the flow to the beginning at block 302.

In some embodiments, the methods and systems described above are implemented in a system including one or more integrated circuit (IC) devices (also referred to as integrated circuit packages or microchips), such as the multi-core processor described above with reference to FIGS. 1-3. EDA and computer aided design (CAD) software tools are often used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code includes instructions, data, or a combination of instructions and data. The software instructions representing a design tool or fabrication tool typically are stored in a computer readable storage medium accessible to the computing system. Likewise, the code representative of one or more phases of the design or fabrication of an IC device are often stored in and accessed from the same computer readable storage medium or a different computer readable storage medium.

A computer readable storage medium often includes any non-transitory storage medium, or combination of non-transitory storage media, accessible by a computer system during use to provide instructions and/or data to the computer system. Such storage media includes, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium is often embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above are implemented by one or more processors of a processing system executing software. The software includes one or more sets of executable instructions stored or otherwise tangibly embodied on a non-transitory computer readable storage medium. The software includes the instructions and certain data that, when executed by the one or more cores, manipulate the one or more cores to perform one or more aspects of the techniques described above. The non-transitory computer readable storage medium includes, for example, a magnetic or optical disk storage device, solid state storage devices such as Flash memory, a cache, random access memory (RAM) or other non-volatile memory device or devices, and the like. The executable instructions stored on the non-transitory computer readable storage medium are often in source code, assembly language code, object code, or other instruction format that is interpreted or otherwise executable by one or more processors.

Note that not all of the activities or elements described above in the general description are required, that a portion of a specific activity or device are not all required, and that one or more further activities are optionally performed, or elements included, in addition to those described. Still further, the order in which activities are listed are not necessarily the order in which they are performed. Also, the concepts have been described with reference to specific embodiments. However, one of ordinary skill in the art appreciates that various modifications and changes are possible without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that cause any benefit, advantage, or solution to occur or become more pronounced are not to be construed as a critical, required, or essential feature of any or all the claims. Moreover, the particular embodiments disclosed above are illustrative only, as the disclosed subject matter are modified and practiced in different but equivalent manners apparent to those skilled in the art having the benefit of the teachings herein. No limitations are intended to the details of construction or design herein shown, other than as described in the claims below. It is therefore evident that the particular embodiments disclosed above are optionally altered or modified and all such variations are considered within the scope of the disclosed subject matter. Accordingly, the protection sought herein is as set forth in the claims below.

What is claimed is:

1. A method, comprising:
in response to a first load access to a first semaphore at a processor, generating a first speculative access to the first semaphore, the first semaphore governing access to a first shared memory location;
in response to flushing the first speculative access from a processor core of the processor, increasing a count of flushed accesses to the first semaphore; and
in response to a second load access to the first semaphore at the processor, suppressing generation of a second speculative access to the first semaphore responsive to the count of flushed accesses to the first semaphore being above a threshold.

2. The method of claim 1, further comprising:
in response to the second load access to the first semaphore, issuing the second speculative access to the first semaphore responsive to the count of flushed accesses to the first semaphore being below the threshold.

3. The method of claim 2, further comprising:
in response to issuing the second speculative access to the first semaphore, increasing the count of flushed accesses to the first semaphore in response to flushing the second speculative access from the processor core.

4. The method of claim 1, further comprising:
in response to suppressing the second speculative access to the first semaphore, issuing a non-speculative access to the first semaphore in response to the second load access indicating the first semaphore has a specified value indicating that the first shared memory location is available for access.

5. The method of claim 1, wherein the first speculative access and the second speculative access each comprise store instructions to store a specified value to the first semaphore indicating that the first shared memory location is not available for access.

6. The method of claim 1, further comprising:
in response to a third load access to a second semaphore at a processor, generating a third speculative access to the second semaphore, the second semaphore governing access to a second shared memory location;
in response to flushing the third speculative access from the processor core of the processor, increasing a count of flushed accesses to the second semaphore; and
in response to a fourth load access to the second semaphore at the processor, suppressing generation of a fourth speculative access to the second semaphore responsive to the count of flushed accesses to the second semaphore being above the threshold.

7. The method of claim 1, wherein:
suppressing generation of the second speculative access comprises suppressing generation of the second speculative access based on an instruction pointer value associated with the second load access.

8. A method, comprising:
issuing, at a processor, speculative accesses to a semaphore governing access to a shared memory location;
monitoring, at a processor, a count of the speculative accesses that are flushed from a first processor core of the processor; and
suppressing speculative accesses to the semaphore in response to the count of flushed speculative accesses exceeding a threshold.

9. The method of claim 8, further comprising:
flushing, from the first processor core, a first speculative access to the semaphore in response to a first access to the semaphore indicating the shared memory location is being accessed by a second processor core.

10. The method of claim 9, further comprising:
increasing the count of the speculative accesses in response to flushing the first speculative access.

11. The method of claim 8, further comprising:
in response to the count of flushed speculative accesses exceeding the threshold, issuing store accesses to the semaphore non-speculatively.

12. The method of claim 8, wherein the speculative accesses comprise store accesses to store a specified value to the semaphore indicating that the shared memory location is being accessed.

13. The method of claim 8, further comprising:
resuming speculative accesses to the semaphore after a threshold amount of time.

14. A processor, comprising:
a first semaphore governing access to a first shared memory location;
a first processor core to generate a first speculative access to the first semaphore in response to a first load access to the first semaphore;
a first counter to, in response to the first processor core flushing the first speculative access, increase a count of flushed accesses to the first semaphore; and
the first processor core configured to, in response to a second load access to the first semaphore at the processor, suppress generation of a second speculative access to the first semaphore responsive to the count of flushed accesses to the first semaphore being above a threshold.

15. The processor of claim 14, wherein the first processor core is configured to:
in response to the second load access to the first semaphore, issue the second speculative access the first semaphore responsive to the count of flushed accesses to the first semaphore being below the threshold.

16. The processor of claim 15, wherein the first counter is configured to:
in response to the first processor core issuing the second speculative access to the first semaphore, increasing the count of flushed accesses to the first semaphore in response to flushing the second speculative access from the first processor core.

17. The processor of claim 14, wherein the first processor core is configured to:
in response to suppressing the second speculative access to the first semaphore, issue a non-speculative access to the first semaphore in response to the second load access indicating the first semaphore has a specified value indicating that the first shared memory location is available for access.

18. The processor of claim 14, wherein the first speculative access and the second speculative access each comprise store instructions to store a specified value to first the semaphore indicating that the first shared memory location is not available for access.

19. The processor of claim 14, further comprising:
a second semaphore governing access to a second shared memory location;
a second processor core configured to, in response to a third load access to the second semaphore, generate a third speculative access to the second semaphore;
a second counter configured to, in response to flushing the third speculative access, increase a count of flushed accesses to the second semaphore; and wherein the second processor core is configured to, in response to a fourth load access to the second semaphore, suppress generation of a fourth speculative access to the second semaphore responsive to the count of flushed accesses to the second semaphore being above the threshold.

20. The processor of claim 14, wherein the first processor core is configured to:
suppress generation of the second speculative access comprises by suppressing generation of the second speculative access based on an instruction pointer value associated with the second load access.

* * * * *